United States Patent
Amit et al.

(10) Patent No.: US 8,246,376 B2
(45) Date of Patent: Aug. 21, 2012

(54) ELECTRICAL CONNECTOR WITH FLEXIBLE BLADE SHAPED HANDLE

(75) Inventors: Gad Amit, San Mateo, CA (US); Inbal Etgar, San Francisco, CA (US); Chadwick John Harber, San Francisco, CA (US); Mike Massucco, Oakland, CA (US)

(73) Assignee: Better Place GmbH, Zug (CH)

( * ) Notice: Subject to any disclaimer, the term of this patent is extended or adjusted under 35 U.S.C. 154(b) by 118 days.

(21) Appl. No.: 12/986,101

(22) Filed: Jan. 6, 2011

(65) Prior Publication Data

US 2011/0097920 A1    Apr. 28, 2011

Related U.S. Application Data

(63) Continuation of application No. 12/559,462, filed on Sep. 14, 2009, now Pat. No. 7,972,167.

(51) Int. Cl.
*H01R 13/58* (2006.01)

(52) U.S. Cl. ....................................................... 439/456

(58) Field of Classification Search .................. None
See application file for complete search history.

(56) References Cited

U.S. PATENT DOCUMENTS

| | | | |
|---|---|---|---|
| 3,197,830 A | 8/1965 | Hoadley | 24/16 PB |
| 3,690,397 A | 9/1972 | Parker | 180/65 |
| 3,799,063 A | 3/1974 | Reed | 104/34 |
| D235,555 S | 6/1975 | Plummer | D26/5 R |
| D237,718 S | 11/1975 | Bozich | D26/12 |
| 4,052,655 A | 10/1977 | Vizza | 320/2 |
| 4,102,273 A | 7/1978 | Merkle et al. | 104/34 |
| 4,309,644 A | 1/1982 | Reimers et al. | 318/139 |
| 4,338,587 A | 7/1982 | Chiappetti | 340/32 |
| 4,347,472 A | 8/1982 | Lemelson | 320/2 |
| 4,352,992 A | 10/1982 | Buennagel et al. | 307/40 |
| 4,365,681 A | 12/1982 | Singh | 180/68.5 |
| 4,383,210 A | 5/1983 | Wilkinson | 320/2 |
| 4,404,641 A | 9/1983 | Bazarnik | 364/569 |

(Continued)

FOREIGN PATENT DOCUMENTS

DE    3439038 A1    10/1984

(Continued)

OTHER PUBLICATIONS

Heavy Duty Connectors, May 13, 2010, 5 pgs. www.weidmuller.com (http://www.weidmuller.com).

(Continued)

*Primary Examiner* — Chandrika Prasad
(74) *Attorney, Agent, or Firm* — Morgan, Lewis & Bockius LLP

(57) ABSTRACT

The flexible electrical connector is designed to facilitate electrical connections between a power receiving device, such as an at least partially electric vehicle, and a power supplying device, such as an electric vehicle charging station. The flexible electrical connector has a blade shaped housing attached to a power cord that extends to the power supplying device. The blade shaped housing has a substantially rigid end portion with an electrical interface configured to detachably mate with a corresponding electrical interface on the power receiving device. The blade shaped housing also has a handle portion made of a substantially flexible material such which is configured to flex about the rigid end portion along an arc in a single plane. As such, the flexible handle can absorb impacts it receives rather than transferring them to the rigid and breakable electrical interface components.

22 Claims, 8 Drawing Sheets

U.S. PATENT DOCUMENTS

| | | | | |
|---|---|---|---|---|
| D270,831 S | 10/1983 | Jensen | | D13/40 |
| D274,126 S | 6/1984 | Flies | | D8/347 |
| 4,532,418 A | 7/1985 | Meese et al. | | 235/381 |
| 4,532,511 A | 7/1985 | Lemelson | | 340/933 |
| D286,040 S | 10/1986 | LaValle | | D13/24 |
| D286,854 S | 11/1986 | Fane et al. | | D8/347 |
| 4,709,202 A | 11/1987 | Koenck et al. | | 320/43 |
| 4,789,047 A | 12/1988 | Knobloch | | 184/1.5 |
| 4,791,871 A | 12/1988 | Mowll | | 104/94 |
| 4,800,328 A | 1/1989 | Bolger et al. | | 320/2 |
| D299,821 S | 2/1989 | Dively | | D13/31 |
| 4,861,971 A | 8/1989 | Chan | | 235/384 |
| 4,876,513 A | 10/1989 | Brilmyer et al. | | 324/427 |
| 4,876,540 A | 10/1989 | Berthon et al. | | 340/932.2 |
| 4,880,097 A | 11/1989 | Speas | | 194/239 |
| D307,580 S | 5/1990 | Reali | | D13/133 |
| D308,267 S | 5/1990 | Bradd | | D32/31 |
| 4,960,150 A | 10/1990 | Ryan | | 137/234.6 |
| 4,967,895 A | 11/1990 | Speas | | 194/200 |
| D314,182 S | 1/1991 | Moerman | | D13/152 |
| 5,003,476 A | 3/1991 | Abe | | 364/424.03 |
| 5,003,520 A | 3/1991 | Grieu et al. | | 368/90 |
| 5,049,802 A | 9/1991 | Mintus et al. | | 320/2 |
| 5,058,044 A | 10/1991 | Stewart et al. | | 364/551.01 |
| 5,072,380 A | 12/1991 | Randelman et al. | | 364/406 |
| 5,091,856 A | 2/1992 | Hasegawa et al. | | 364/424.05 |
| 5,151,865 A | 9/1992 | Blessing et al. | | 364/483 |
| 5,157,319 A | 10/1992 | Klontz et al. | | 320/2 |
| 5,159,272 A | 10/1992 | Rao et al. | | 324/429 |
| 5,184,058 A | 2/1993 | Hesse et al. | | 320/4 |
| 5,189,836 A | 3/1993 | Alder et al. | | 49/33 |
| 5,202,617 A | 4/1993 | Nor | | 320/2 |
| 5,206,578 A | 4/1993 | Nor | | 320/14 |
| 5,229,704 A | 7/1993 | Knepper | | 320/2 |
| 5,230,637 A * | 7/1993 | Weber | | 439/504 |
| 5,263,565 A | 11/1993 | Wilkinson | | 194/216 |
| 5,297,664 A | 3/1994 | Tseng et al. | | 194/217 |
| 5,306,999 A | 4/1994 | Hoffman | | 320/2 |
| 5,315,227 A | 5/1994 | Pierson et al. | | 320/2 |
| D349,099 S | 7/1994 | Robertson, Jr. et al. | | D13/147 |
| 5,327,066 A | 7/1994 | Smith | | 320/2 |
| 5,349,535 A | 9/1994 | Gupta | | 364/483 |
| 5,350,312 A * | 9/1994 | Kuno et al. | | 439/310 |
| 5,369,352 A | 11/1994 | Toepfer et al. | | 320/56 |
| 5,453,585 A | 9/1995 | Lenz et al. | | 191/12.2 R |
| 5,461,299 A | 10/1995 | Bruni | | 320/2 |
| 5,462,439 A | 10/1995 | Keith | | 439/34 |
| 5,478,250 A | 12/1995 | Hoffman | | 439/142 |
| 5,535,274 A | 7/1996 | Braitberg et al. | | 379/446 |
| 5,539,399 A | 7/1996 | Takahira et al. | | 340/995 |
| D373,192 S | 8/1996 | Murphy et al. | | D24/129 |
| 5,542,488 A | 8/1996 | Nixon | | 180/65.1 |
| 5,545,046 A | 8/1996 | Masuda et al. | | 439/142 |
| 5,563,491 A | 10/1996 | Tseng | | 320/2 |
| 5,568,390 A | 10/1996 | Hirota et al. | | 364/449 |
| 5,573,090 A | 11/1996 | Ross | | 191/10 |
| 5,585,205 A | 12/1996 | Kohchi | | 429/99 |
| 5,590,749 A | 1/1997 | Wagner et al. | | 191/12.4 |
| 5,612,606 A | 3/1997 | Guimarin et al. | | 320/2 |
| 5,614,808 A | 3/1997 | Konoya et al. | | 320/48 |
| 5,627,448 A | 5/1997 | Okada et al. | | 320/2 |
| 5,627,752 A | 5/1997 | Buck et al. | | 364/424.04 |
| 5,631,536 A | 5/1997 | Tseng | | 320/15 |
| 5,644,209 A | 7/1997 | Chabbert et al. | | 320/15 |
| 5,656,916 A | 8/1997 | Hotta | | 320/22 |
| 5,696,367 A | 12/1997 | Keith | | 235/381 |
| 5,701,706 A | 12/1997 | Kreysler et al. | | 52/169.6 |
| 5,703,461 A | 12/1997 | Minoshima et al. | | 320/2 |
| 5,711,648 A | 1/1998 | Hammerslag | | 414/786 |
| 5,742,229 A | 4/1998 | Smith | | 340/438 |
| 5,758,414 A | 6/1998 | Ehrenfels | | 29/857 |
| 5,815,824 A | 9/1998 | Saga et al. | | 701/22 |
| 5,821,731 A | 10/1998 | Kuki et al. | | 320/108 |
| 5,822,427 A | 10/1998 | Braitberg et al. | | 379/454 |
| 5,903,064 A | 5/1999 | Norberg | | 307/40 |
| 5,906,500 A | 5/1999 | Kakuta et al. | | 439/310 |
| 5,913,917 A | 6/1999 | Murphy | | 701/123 |
| 5,927,938 A | 7/1999 | Hammerslag | | 414/809 |
| 5,951,229 A | 9/1999 | Hammerslag | | 414/398 |
| D415,111 S | 10/1999 | Lee | | D13/154 |
| 5,979,605 A | 11/1999 | Popp | | 187/205 |
| 5,998,963 A | 12/1999 | Aaseth | | 320/109 |
| 6,002,396 A | 12/1999 | Davies | | 345/339 |
| 6,014,597 A | 1/2000 | Kochanneck | | 701/22 |
| D420,644 S | 2/2000 | Nemser et al. | | D13/146 |
| 6,088,963 A | 7/2000 | Cawthon et al. | | 49/33 |
| 6,094,028 A | 7/2000 | Gu et al. | | 320/109 |
| D429,622 S | 8/2000 | Bickle | | D8/347 |
| 6,114,632 A | 9/2000 | Planas, Sr. et al. | | 174/117 R |
| 6,123,569 A | 9/2000 | Fukushima et al. | | 439/456 |
| D434,001 S | 11/2000 | Sayger | | D13/139.5 |
| 6,177,879 B1 | 1/2001 | Kokubu et al. | | 340/825.33 |
| 6,204,505 B1 | 3/2001 | Call | | 250/370.01 |
| 6,240,684 B1 | 6/2001 | Bigelow | | 52/174 |
| 6,371,768 B1 * | 4/2002 | Neblett et al. | | 439/34 |
| 6,388,564 B1 | 5/2002 | Piercy et al. | | 340/310.01 |
| 6,487,477 B1 | 11/2002 | Woestman et al. | | 701/22 |
| 6,539,678 B1 | 4/2003 | Campbell et al. | | 52/169.7 |
| 6,727,809 B1 | 4/2004 | Smith | | 340/438 |
| 6,909,287 B2 | 6/2005 | Bertness | | 324/427 |
| D515,033 S | 2/2006 | Petrick et al. | | D13/139.4 |
| 7,003,411 B2 | 2/2006 | Bertness | | 702/63 |
| D517,591 S | 3/2006 | Kokido | | D17/9 |
| D522,963 S | 6/2006 | Hayes et al. | | D13/108 |
| 7,090,521 B2 | 8/2006 | Nishio et al. | | 439/248 |
| 7,158,008 B2 | 1/2007 | Waring et al. | | 340/5.66 |
| 7,201,384 B2 | 4/2007 | Chaney | | 280/68.5 |
| 7,256,516 B2 | 8/2007 | Buchanan et al. | | 307/62 |
| D559,785 S | 1/2008 | Tosetti | | D13/147 |
| 7,400,113 B2 | 7/2008 | Osborne | | 320/118 |
| 7,411,371 B2 | 8/2008 | Hobbs | | 320/128 |
| 7,444,192 B2 | 10/2008 | Dickinson et al. | | 700/83 |
| 7,602,143 B2 | 10/2009 | Capizzo | | 320/109 |
| D607,831 S | 1/2010 | Andre et al. | | D13/154 |
| 7,826,941 B2 | 11/2010 | Hayashi et al. | | 701/22 |
| 2001/0002789 A1 | 6/2001 | Terazoe | | 320/108 |
| 2002/0026252 A1 | 2/2002 | Wruck et al. | | 700/90 |
| 2003/0209375 A1 | 11/2003 | Suzuki et al. | | 180/65.3 |
| 2004/0044452 A1 | 3/2004 | Bauer et al. | | 701/33 |
| 2005/0032404 A1 | 2/2005 | Furuta et al. | | 439/157 |
| 2005/0138432 A1 | 6/2005 | Ransom et al. | | 713/201 |
| 2005/0162172 A1 | 7/2005 | Bertness | | 324/426 |
| 2006/0028171 A1 | 2/2006 | Marraffa | | 320/107 |
| 2006/0149459 A1 | 7/2006 | Matsuura et al. | | 701/201 |
| 2006/0185756 A1 | 8/2006 | Sato et al. | | 141/94 |
| 2006/0208695 A1 * | 9/2006 | Weinstein et al. | | 320/110 |
| 2006/0229806 A1 | 10/2006 | Forlenza et al. | | 701/207 |
| 2006/0277882 A1 | 12/2006 | Berger et al. | | 56/10.2 J |
| 2007/0113921 A1 | 5/2007 | Capizzo | | 141/231 |
| 2007/0241721 A1 * | 10/2007 | Weinstein et al. | | 320/114 |
| 2008/0258682 A1 | 10/2008 | Li | | 320/109 |
| 2008/0315837 A1 | 12/2008 | Elder et al. | | 320/134 |
| 2009/0011639 A1 | 1/2009 | Ballard et al. | | 439/607 |
| 2009/0024232 A1 | 1/2009 | Dickinson et al. | | 700/89 |
| 2010/0145717 A1 | 6/2010 | Hoeltzel | | 705/1.1 |
| 2010/0280702 A1 | 11/2010 | Artus | | 701/30 |
| 2010/0286938 A1 | 11/2010 | Kaneko | | 702/63 |

FOREIGN PATENT DOCUMENTS

| | | |
|---|---|---|
| DE | 10338279 A1 | 3/2005 |
| EP | 0047089 A1 | 3/1982 |
| EP | 0233638 A2 | 8/1987 |
| EP | 0476405 A1 | 3/1992 |
| EP | 0548748 A1 | 6/1993 |
| EP | 0551080 A2 | 7/1993 |
| EP | 0599528 A2 | 6/1994 |
| EP | 0644625 A1 | 3/1995 |
| EP | 0692849 A1 | 1/1996 |
| EP | 1170609 A2 | 1/2002 |
| EP | 1275936 A2 | 1/2003 |
| FR | 2685547 A1 | 6/1993 |
| FR | 2696139 A1 | 4/1994 |
| FR | 2721559 A1 | 12/1995 |
| FR | 2737694 A1 | 2/1997 |
| GB | 1377729 | 12/1974 |
| GB | 2219151 A | 11/1989 |
| GB | 2253379 A | 9/1992 |

| | | |
|---|---|---|
| JP | 2004-331020 | 11/2004 |
| JP | 2006-113892 | 4/2006 |
| WO | WO 93/02887 A1 | 2/1993 |
| WO | WO 93/08629 A1 | 4/1993 |
| WO | WO 93/08630 A1 | 4/1993 |
| WO | WO 94/09544 A1 | 4/1994 |
| WO | WO 94/11853 A1 | 5/1994 |
| WO | WO 94/26002 A1 | 11/1994 |
| WO | WO 94/28526 A1 | 12/1994 |
| WO | WO 96/01520 A1 | 1/1996 |
| WO | WO 98/21132 A1 | 5/1998 |
| WO | WO 2008/073453 A1 | 6/2008 |
| WO | WO 2008/073470 A2 | 6/2008 |
| WO | WO 2008/073472 A2 | 6/2008 |
| WO | WO 2008/073474 A2 | 6/2008 |
| WO | WO 2008/073476 A2 | 6/2008 |
| WO | WO 2008/073477 A2 | 6/2008 |
| WO | WO 2009/109826 A1 | 9/2009 |
| WO | WO 2009/156780 A1 | 12/2009 |
| WO | WO 2010/004192 A2 | 1/2010 |
| WO | WO 2010/015777 A1 | 2/2010 |
| WO | WO 2010/076457 A1 | 7/2010 |
| WO | WO 2010/124831 A2 | 11/2010 |

OTHER PUBLICATIONS

International Search Report and Written Opinion for PCT/US2008/077132 dated Dec. 1, 2008, 8 pgs.
International Search Report and Written Opinion for PCT/US2009/057594 dated Dec. 16, 2009, 9 pgs.
International Preliminary Examination Report for PCT/US08/77132 dated Feb. 22, 2010, 5 pgs.
International Search Report and Written Opinion for PCT/US2009/057596 dated Dec. 30, 2009, 10 pgs.
European Search Report EP 08832521 dated Feb. 2, 2011, 5 pgs.
International Search Report and Written Opinion for PCT/2010/048661 dated Dec. 10, 2010, 9 pgs.

* cited by examiner

ELECTRICAL CONNECTOR WITH FLEXIBLE BLADE SHAPED HANDLE

CROSS REFERENCE TO RELATED APPLICATIONS

This application is a continuation of U.S. application Ser. No. 12/559,462, filed Sep. 14, 2009 now U.S. Pat. No. 7,972,167, which is hereby incorporated by reference in its entirety.

TECHNICAL FIELD

The disclosed embodiments relate generally to flexible connectors for attaching electric vehicles to power sources.

BACKGROUND

Vehicles (e.g., cars, trucks, planes, boats, motorcycles, autonomous vehicles, robots, forklift trucks etc.) are an integral part of the modern economy. Unfortunately, fossil fuels, like oil which is typically used to power such vehicles, have numerous drawbacks including a reliance on limited foreign sources of fossil fuels such fuels produce pollution and climate change. One way to address these problems is to increase the fuel economy of these vehicles. Recently, gasoline-electric hybrid vehicles have been introduced, which consume substantially less fuel than their traditional internal combustion counterparts, i.e., they have better fuel economy. However, gasoline-electric hybrid vehicles do not eliminate the need for fossil fuels, as they still require an internal combustion engine in addition to the electric motor. Another way to address this problem is to use renewable resource fuels such as bio-fuels. Bio-fuels, however, are currently expensive and years away from widespread commercial use.

Yet another way to address these problems is to use clean technologies, such as electric motors powered by rechargeable fuel cells or batteries. However, rechargeable batteries can take many hours to recharge. For example, batteries may need to be recharged overnight. Furthermore, the re-charging may take place in a public area while the vehicle's owner or operator is not nearby. The connection components between the vehicle and the power source may be subject to accidental or malicious contact during the charging operation which may damage the sensitive electrical interface components.

Accordingly, it would be highly desirable to provide a system for connecting an electric vehicle to a power source that is capable of addressing the above described difficulties.

SUMMARY

In order to overcome the above described drawbacks, a flexible electrical connector is provided which can flex in at least one plane such that it can absorb some or all of the force of an impact rather than transferring the impact force to a power receiving device. The flexible connectors are designed with handles that are rigid or substantially rigid in at least one plane to assist a user attaching the connector to the power receiving device such as an electric vehicle. The flexible connectors are also designed to bend or flex so that if bumped by a passerby or other vehicle the connection between the vehicle and the power source will not be interrupted and the vehicle connection ports will not be damaged. In some embodiments, the handles are flexible enough to fold or flex through 180° to the surface of the vehicle.

In some embodiments, a flexible electrical connector for supplying power to a receiving device is provided. The flexible electrical connector includes a blade-shaped housing and a power cord. The blade shaped housing has a first portion and an opposing second portion. The first portion has an electrical interface which is configured to detachably mate with a corresponding electrical interface on a receiving device. The power cord extends from the second portion of the housing. The second portion of the housing is configured to flex about the first portion of the housing along an arc in a single plane.

In some embodiments, the receiving device is an at least partially electric vehicle and the single plane is parallel to a plane formed by a bottom surface of the at least partially electric vehicle.

In some embodiments, the second portion of the blade-shaped housing is made of a resilient material. In some embodiments, the second portion of the blade-shaped housing cannot flex in an additional plane. In some embodiments, the additional plane is perpendicular to the single plane about which the second portion of the housing is configured to flex. In some embodiments, the second portion of the blade-shaped housing is further configured to at least partially twist about a line extending from the first portion to the second portion.

In some embodiments, the second portion of the blade-shaped housing configured to flex along the arc at least plus and minus 35° from a line extending from the first portion to the second portion when the flexible electrical connector is in a rest position. In some embodiments, it is configured to flex along the arc less than plus and minus 180° from a line extending from the first portion to the second portion when the flexible electrical connector is in a rest position.

In some embodiments, the blade-shaped housing has a length, a height, and a width. The length extends between a remote end of the first portion to a remote end of the second portion, and the length is substantially larger than the height which is substantially larger than the width. In some embodiments, the length is at least twice as long as the height and the height is at least twice as long as the width.

In some embodiments, the power cord is substantially flat. In some embodiments, the power cord includes crease lines to aid in bending the flat power cord. In some embodiments, the power cord is foldable with attachment mechanisms for attaching to itself, the attachments mechanisms such as metal snaps, flexible snaps, magnets, clips, and hook and loop elements. In some embodiments, the power cord includes power cables and data cables. In some embodiments, the power cord includes high current power cables and low current data cables.

In some embodiments, the first portion further comprises a lock for fixing the flexible electrical connector to the receiving device. In some embodiments, the lock is configured to release when one or more of the following occur: the receiving device is fully charged, a user remotely unlocks the receiving device using a wireless unlocking device, and the charging is cancelled.

In some embodiments, the blade-shaped housing has a length, a height, and a width. When attached to the receiving device the length extends from a remote end of the first portion to a remote end of the second portion along a first plane extending there through. The height extends parallel to a second plane extending from a top of the receiving device to a bottom of the receiving device. The width extends parallel to a third plane orthogonal to the first and the second planes. The second portion of the housing is configured to flex about the first portion of the housing along an arc in the first plane which is orthogonal to the second and the third planes.

In some embodiments, a flexible electrical connector kit for supplying power to a receiving device is provided. The flexible electrical connector kit includes a first blade-shaped housing, a second housing, and a cord there between. The first blade-shaped housing has a first portion and an opposing second portion. The first portion has an electrical interface which is configured to detachably mate with a corresponding electrical interface on a receiving device. The power cord extends from the second portion of the housing. The second portion of the housing is configured to flex about the first portion of the housing along an arc in a single plane. The second housing has a first portion and an opposing second portion. The first portion has an electrical interface configured to detachably mate with a corresponding electrical interface on a power supply device. The power cord extends from the second portion.

In some embodiments, the first portion of the blade-shaped housing and the first portion of the second housing of the flexible electrical connector kit are both made of a substantially rigid material. In some embodiments of the connector kit, the second portion of the blade-shaped housing defines a hole there through and the second portion of the second housing comprises a protruding element shaped to fit the hole in the blade-shaped housing such that the protruding element will remain at least partially frictionally restrained in the hole after the protruding element and the hole have been pressed together. In some embodiments, the cord of the flexible electrical connector kit is flat to facilitate folding for storage. In some embodiments, the electrical connector kit is in its storage position when the flat cable is folded, the protruding element is pressed into the hole, and the attachment mechanisms are appropriately engaged with one another.

In some embodiments, a flexible electrical connector is provided for supplying power to a receiving device. The flexible electrical connector comprises a blade-shaped housing and a power cord. The blade-shaped housing has a first portion and an opposing second portion and a length, a height, and a width. The length extends between a remote end of the first portion to a remote end of the second portion. The length is larger than the height which is larger than the width. The first portion has an electrical interface which is configured to detachably mate with a corresponding electrical interface on an at least partially electric vehicle. The power cord extends from the second portion of the housing. The second portion of the housing is configured to flex about the first portion.

The above described embodiments address the previously mentioned drawbacks because the flexible electrical connector can flex in at least one plane to absorb some or all of the force of an impact. Thus the impact force is absorbed and dissipated rather than transferring the impact force to a power receiving device. Since the flexible connectors are designed with handles that are rigid or substantially rigid in at least one plane, the user can overcome the frictional resistance required to insert the electrical connector into the power receiving device.

BRIEF DESCRIPTION OF THE DRAWINGS

Like reference numerals refer to corresponding parts throughout the drawings.

DESCRIPTION OF EMBODIMENTS

One way to address various drawbacks with fossil fuels, like oil which is typically used to power vehicles, is to use vehicles with electric motors. In some embodiments, electric motors can also be powered by rechargeable batteries. Rechargeable batteries can be used to power other devices besides vehicles. In both cases, current rechargeable battery technology typically requires hours for the batteries to recharge.

As charging of an electric vehicle takes a significantly longer period of time than filling a gas powered vehicle with gas, the owner or operator of the vehicle is unlikely to remain with the vehicle for the entire recharging operation. Sometimes the vehicle will be located in a user's home or private parking garage or lot where it is protected from most malicious or accidental inference. However, some vehicle charging stations are located in public places such as public parking lots, along public streets, or in public parking garages. Some of these public areas may have a lot of foot traffic near the vehicles. Since the re-charging operation may take place in a public area while the vehicle's owner or operator is not nearby, the connection between the vehicle and the power source may be subject to accidental or malicious contact or interference during the charging operation. As such, the connection between the vehicle and the vehicle charging station should withstand both accidental bumping and malicious removal attempts without damaging the vehicle's charge interface or the connector. Similarly, any power receiving device connected to a power supplying device for recharging would have the same issues. In some embodiments, a flexible electrical connector is provided which can flex in at least one plane such that it can absorb some or all of the force of an impact rather than transferring the impact force to the electric vehicle or other power receiving device.

Figure 1A:
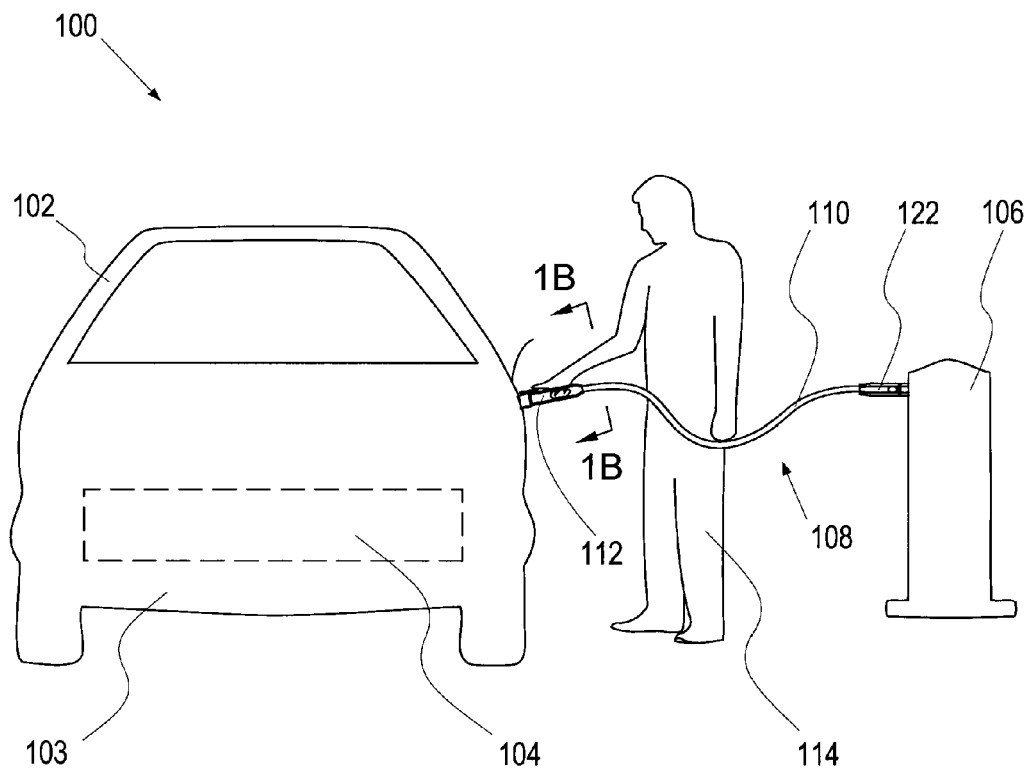
FIGS. 1A and 1B illustrate a charging system according to some embodiments.
Figure 1B:
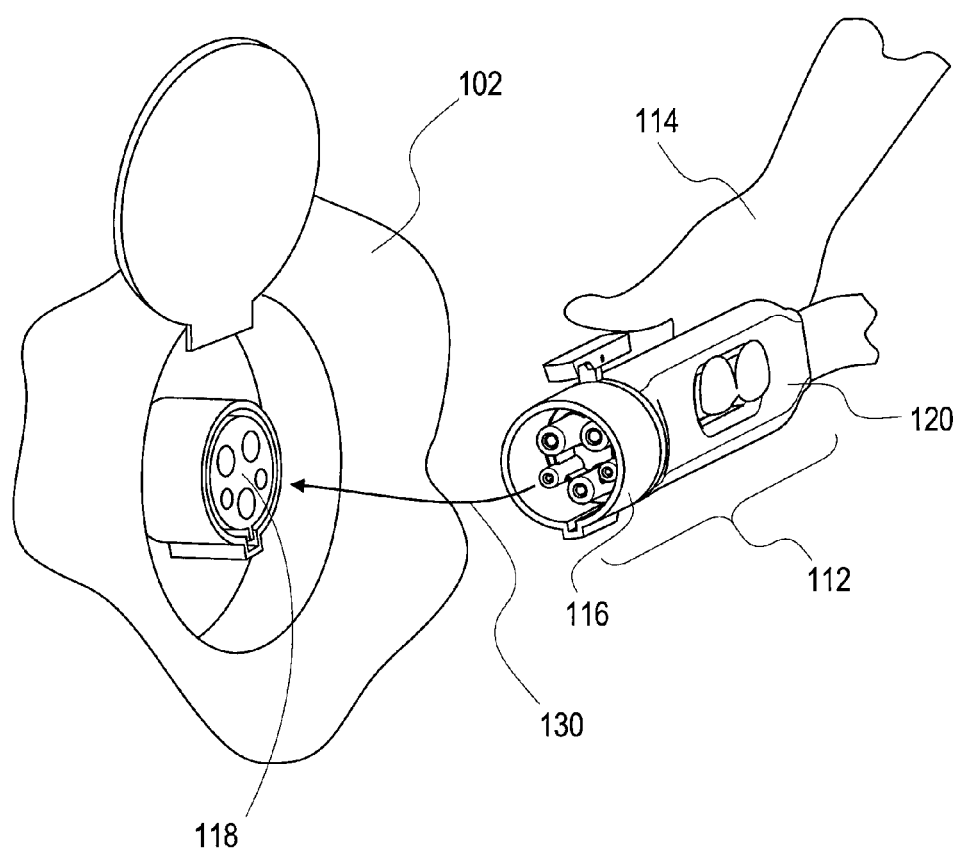

FIGS. 1A and 1B illustrate a charging system 100 according to some embodiments. In some embodiments, a power receiving device 102, such as an at least partially electric vehicle containing a rechargeable battery pack 104, is attached to a power supplying device 106 by means of a connection system 108.

In some embodiments, the battery pack 104 includes any device capable of storing electric energy such as batteries (e.g., lithium ion batteries, lead-acid batteries, nickel-metal hydride batteries, etc.), capacitors, reaction cells (e.g., Zn-air cell), etc. In some embodiments, the battery pack 104 comprises a plurality of individual batteries or battery cells/chemical modules.

In some embodiments, the connection system 108 comprises a flexible electrical connector 200 (shown in FIG. 2) comprising a power cord 110 and a blade-shaped housing 112 on at least one end of the power cord 110 that is configured to detachably attach to the power receiving device 102. As shown in the detailed view of FIG. 1B, in some embodiments, a user 114 attaches the blade-shaped housing 112 to the power receiving device 102 by inserting an end portion 116 of the blade-shaped housing 112 into a corresponding electrical interface 118 on the power receiving device 102 along insertion line 130. The user 114 inserts the end portion 116 of the blade-shaped housing 112 into the corresponding interface 118 by gripping a handle portion 120 of the blade-shaped housing 112. In some embodiments, there is a significant frictional resistance that must be overcome to properly insert the end portion 116 of the blade-shaped housing 112 into the corresponding interface 118 of the power receiving device 102. In some embodiments, this force is 80N. As such, in some embodiments, the handle portion 120 of the blade-shaped housing 112 remains rigid and does not flex in at least one plane (e.g., the vertical plane) to facilitate the user 114 gripping and inserting the blade-shaped housing 112 into the power receiving device 102. Furthermore, the handle portion 120 does not substantially compress along its length when the blade-shaped housing 112 is inserted into the power receiving device 102.

In some embodiments, the other end of the power cord 110 remote from the blade-shaped housing 112 is permanently attached to the power supplying device 106. In some embodiments, the power supplying device 106 has a mechanism for retracting at least a portion of the power cord 110, while in other embodiments the power supplying device 106 comprises a mechanism to retract substantially all of the power cord 110 into the housing of the power supplying device 106 when not in use. In some embodiments, the power supplying device 106 comprises a mechanism to restrain the power cord 110 near the housing of the power supplying device 106 when not in use. In some embodiments, the power supplying device 106 is a free standing charging post attached to the ground as shown in Design Application No. 29/312,808 herein incorporated by reference. In some embodiments, the power supplying device 106 is a wall mounted device. In some embodiments, the power supplying device 106 is ceiling mounted. In some embodiments, a plurality of power supplying devices 106 are interconnected to one another and are controlled by a remote computer.

In some embodiments, the connection system 108 comprises a flexible connector kit 400 (shown in FIG. 4) comprising a power cord 110, a blade-shaped housing 112 on one end of the power cord 110 and an additional housing 122 on the other end of the power cord 110. The blade-shaped housing 112 is configured to detachably connect to the power receiving device 102. The additional housing 122 is configured to detachably mate with the power supplying device 106. In some embodiments, the connector kit 400 is carried by the user 114 and used to attach the power receiving device 102 to the power supplying device 106 when the power supplying device 106 is not equipped with a permanently attached flexible electrical connector 200 (described in relation to FIG. 2.) In some embodiments, the additional housing 122 is similar to the blade-shaped housing 112 described in relation to FIGS. 2 and 3, while in other embodiments, the additional housing 122 has additional features described in relation to FIGS. 4 and 5.

Figure 2:
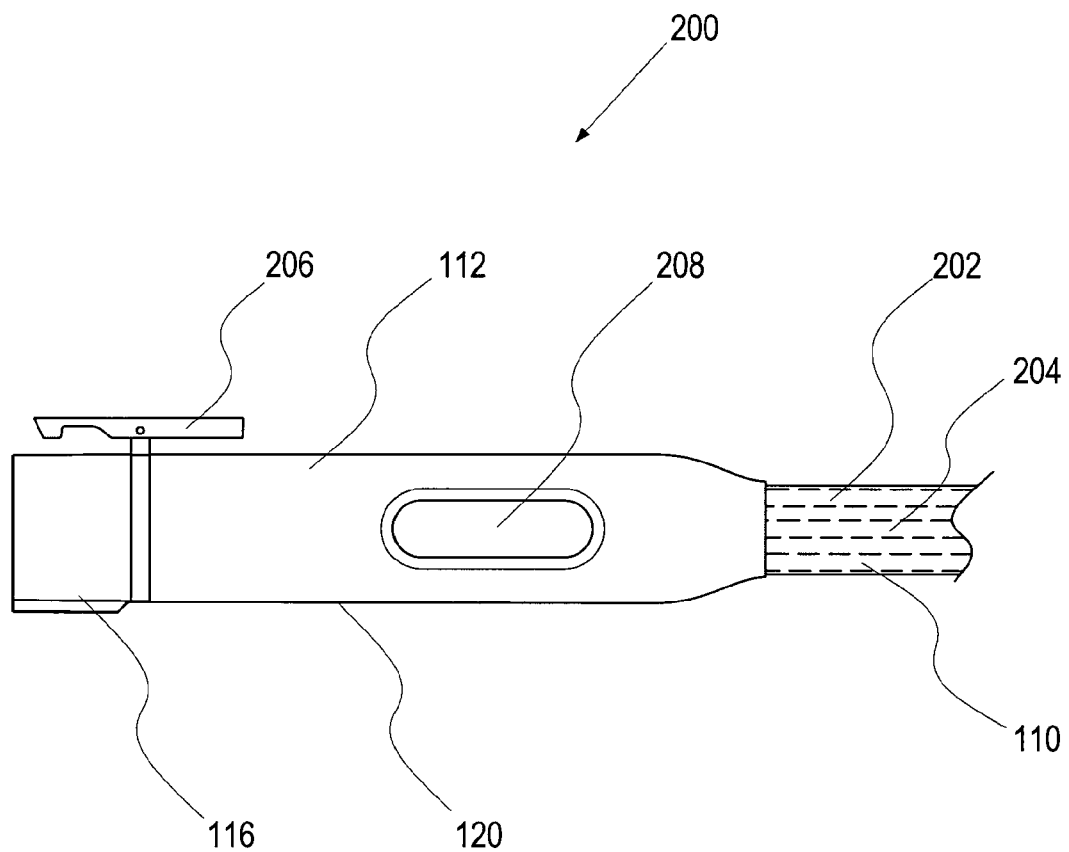
FIG. 2 is a side-view of a flexible electrical connector used in the charging system of FIG. 1A according to one embodiment.
Figure 3:
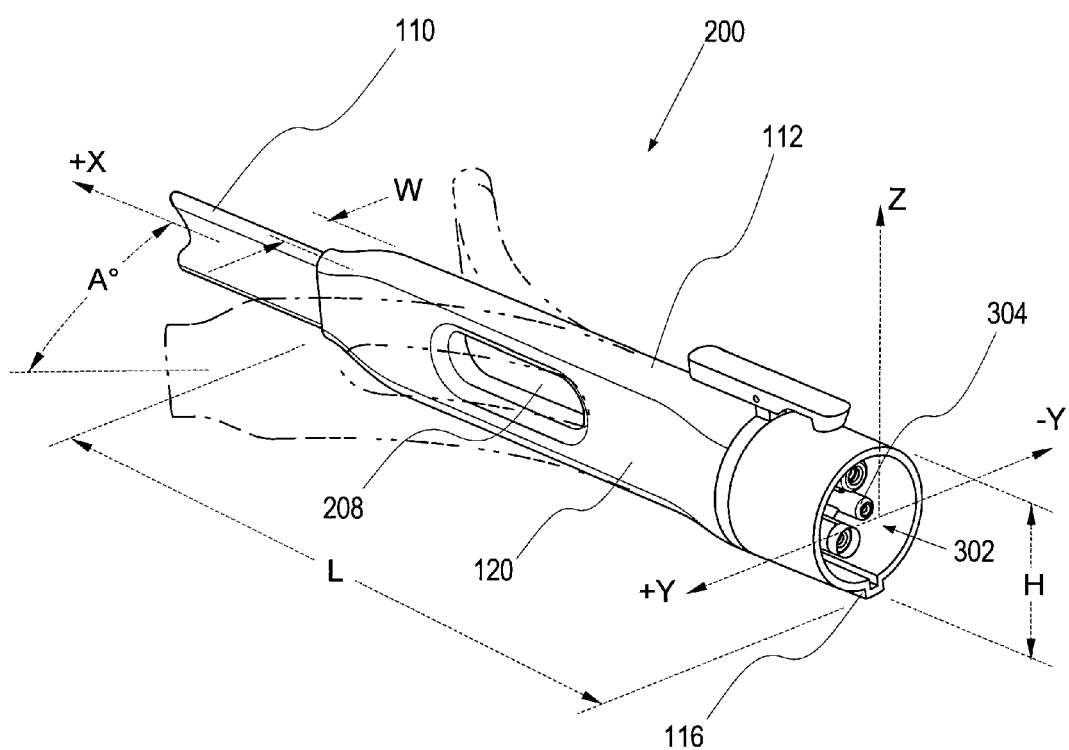
FIG. 3 is a perspective view of the flexible electrical connector of FIG. 2.

FIG. 2 is a side-view of one embodiment of a flexible electrical connector 200. The flexible electrical connector 200 is configured to supply power to a power receiving device 102. In some embodiments, the power receiving device 102 is an at least partially electric vehicle 103 containing one or more rechargeable battery packs 104 as shown in FIG. 1A. In some embodiments, the flexible electrical connector 200 comprises a blade-shaped housing 112 and a power cord 110. In some embodiments, the blade-shaped housing 112 comprises an end portion 116 and an opposing handle portion 120. In some embodiments, the end portion 116 contains an electrical interface 302 (shown in FIG. 3) that is configured to detachably mate with a corresponding electrical interface 118 of the power receiving device 102 (shown in FIG. 1B). In some embodiments, the cord 110 extends from the handle portion 120. In some embodiments, the handle portion 120 is configured to flex about the end portion 116 along an arc in a single plane (as shown in FIG. 3.)

In some embodiments, the cord 110 includes one or more power cables 202 and one or more data cables 204. In some embodiments, the power cables 202 are capable of carrying high current and/or high voltage. In some embodiments, the data 204 cables are capable of carrying low current and/or low voltage.

In some embodiments, the end portion 116 is made from a substantially rigid material. In some embodiments, the substantially rigid material is a hard plastic while in other embodiments, it is a metal. In some embodiments, the end portion 116 also comprises a lock 206 for fixing or locking the flexible electrical connector 200 to the power receiving device 102. In some embodiments, the lock 206 is a biased lever as shown. In other embodiments the lock is a bolt or an electronically actuated lock. In some embodiments, the user 114 physically opens the lock 206 by depressing one end of the biased lever and keeping it depressed until the end portion 116 is properly inserted into the electrical interface 118 of the power receiving device 102. In some embodiments, after the lock 206 is fixed to the power receiving device 102 it cannot be unlocked until the power receiving device 102 is fully charged. In other embodiments, the lock 206 is unlocked by the user 114 physically unlocking and disengaging the flexible electrical connector 200 by depressing one end of the biased lever of the lock and keeping it depressed until the end portion 116 is completely removed from the electrical interface 118 of the power receiving device 102. In other embodiments, when a user 114 remotely unlocks the power receiving device 102, such as by using a wireless unlocking device, the lock 206 on the flexible electrical connector 200 is also unlocked. For example, a user 114 may unlock an at least partially electric vehicle 103 using a key fob, and the act of unlocking the vehicle 103 also unlocks the flexible electrical connector 200 from the electrical interface 118 of the at least partially electric vehicle. In some embodiments, the lock 206 unlocks when the charging of the power receiving device 102 is cancelled by the user 114, the power supplying device 116, or by the electronic power grid. In other embodiments a combination of the above must be used to unlock the flexible electrical connector 200 from the power receiving device. For example the unlocking may require that the user unlock the vehicle 103 and physically depress the biased lever lock 206.

In some embodiments, the handle portion 120 is made of a resilient material. In some embodiments, the resilient material is a cast urethane. In other embodiments the material may be rubber, a rubber based material, a polymer, plastic or any similar material having flexible and resilient properties. In some embodiments, the handle is created using over-molding techniques. In some embodiments, instead of being made of a resilient material, the handle portion 120 is made of a mechanical jointed assembly allowing movement in a single plane. For example, in some embodiments, the handle portion 120 is made of a mechanically jointed assembly of plastic and metal parts that allow movement substantially only in one plane (such as the X-Y plane of FIG. 3.)

In some embodiments, the handle portion 112 defines an opening or hole 208 there through to allow a user to better grip the handle portion 112 by sliding his fingers through the hole 208. In some embodiments, the hole 208 is about an inch tall and four inches long. The hole 208 also decreases the total weight of the flexible electrical connector 200. Furthermore, the hole 208 provides the handle portion 120 more flexibility than it would have without the hole.

In some embodiments, the blade-shaped housing 112 has an emergency release option. For example, if the handle portion 120 bends beyond a predetermine flexibility or the cable is pulled beyond a predetermined tensile force, e.g., by the user accidentally driving away with the cable still plugged into the vehicle, the handle portion 120 breaks away from the end portion 116. While in some embodiments, the release occurs at the interface between the handle portion 120 and the end portion 116. In other embodiments, the breaking at any other suitable location along the connector and cable.

FIG. 3 is a perspective view of the flexible electrical connector 200 of FIG. 2. The end portion 116 contains an electrical interface 302 configured to mate with a corresponding electrical interface 118 of the power receiving device 102 (shown in FIG. 1B). In some embodiments, the electrical interface 302 comprises a plurality of male electrical connector portions 304 configured to mate with corresponding female connector portions on the corresponding electrical interface 118 of the power receiving device 102. In some embodiments, one or more of the male electrical connector portions 304 are configured for power transmission while one or more other male electrical connector portions are configured for data transmission. In other embodiments the electrical interface 302 comprises a plurality of female connector portions while the male connector portions are on the corresponding electrical interface 118 of the power receiving device 102.

As shown in FIG. 3, in some embodiments, the cord 110 is substantially flat. The flatness of the cord assists in retractability and fold-ability. The fold-ability aspect will be discussed with relation to the flexible connector kit 400 the folding and storage of which is discussed in relation to FIG. 6. The retract-ability aspect was discussed in relation to the power supplying devices discussed with relation to FIGS. 1A and 1B.

FIG. 3 includes a coordinate system with the origin at a remote end of the end portion 116. The blade shaped housing 112 has a length L extending between a remote end of the end portion 116 and a remote end of the handle portion 120 along the X-axis. In some embodiments, the length L is seven inches. The blade shaped housing 112 has a height H extending from a bottom edge to a top edge of the end portion 116 along positive and negative Z-axes. In some embodiments, the height H is two inches. The blade shaped portion 112 has a width W extending from a first flat side of the blade-shaped housing 112 to a second flat side of the blade-shaped housing 112 along the positive and negative Y-axes. In some embodiments, the width W is ¾ of an inch. In some embodiments, the length L is greater than the height H which is greater than the width W. In some embodiments, the length L is substantially larger than the height H which is substantially larger than the width W. In some embodiments the length L is at least twice as long as the height H which is at least twice as long as the width W. In some embodiments the length L is four times as long as the height H which is four times as long as the width W.

The handle portion 120 is made of a resilient material, while the end portion 116 is made of a substantially rigid material as discussed in relation to FIG. 2. The blade-shaped housing 112 has a length L greater than its height H which is greater than its width W. The combination of the shape of the blade-shaped housing 112 and the resilient material of the handle portion 120 allows the handle portion 120 to flex about the substantially rigid end portion 116. In some embodiments, the movement or flexing occurs along an arc in a single plane (the X-Y plane of FIG. 3.) In some embodiments, the power receiving device 102 is an at least partially electric vehicle 103 containing a rechargeable battery pack 104, and the single plane (the X-Y plane of FIG. 3) is parallel to a plane formed by a bottom surface of the at least partially electric vehicle 103.

Bending or flexing along an arc in a single plane is advantageous because the bending or flexing allows the blade-shaped housing 112 to absorb some or all of the force of an impact rather than transferring the impact force to the power receiving device 102 and/or its sensitive electrical components. For example, if the blade-shaped housing 112 is hit by a shopping cart in a parking lot it will not disengage from the power receiving device 102, break, or damage the power receiving device's electrical interface 118. Furthermore, allowing the flexing or bending in only a single plane, gives the blade-shaped housing sufficient rigidity in other dimensions to overcome the frictional resistance necessary to properly insert the end portion 116 of the blade-shaped housing 112 into the power receiving device's electrical interface 118. As such the blade-shaped housing 112 allows only insubstantial bending and/or compression in other planes which provides the user 114 with a convenient handle for inserting into the power receiving device 102 for charging.

In some embodiments, the handle portion 120 is configured to flex along a predetermined arc A° from a line extending from the handle portion 120 to the end portion 116 when the flexible electrical connector 200 is in a rest position. For example, in FIG. 3, the handle portion 120 in this embodiment is configured to flex A° on either side of the X-axis. In some embodiments, A°=35°, i.e., the plus and minus 35° from a line extending from the handle portion 120 to the end portion 116 when the flexible electrical connector 200 is in a rest position. For example, in FIG. 3, the handle portion 120 in this embodiment is configured to flex at least 35° on either side of the X-axis. In some embodiments A°=50°, in others A°=90°, in yet others A°=120°, and is still others A°=180°. In other words, the resilient material of the handle portion 120 is resilient enough to allow the handle portion 120 to substantially bend back on itself.

In some embodiments, the handle portion 120 cannot flex in other planes, other then the single plane (X-Y) described above. For example, in FIG. 3 the handle portion remains substantially rigid in the X-Z plane because of the height H as compared to the width W of the blade-shaped housing 112. In some embodiments, the additional plane in which the handle portion 120 does not flex, is perpendicular to the plane in which the handle portion 120 does flex. For example, in FIG. 3 the handle portion flexes in the X-Y plane but remains substantially rigid in the X-Z plane because of the height H as compared to the width W of the blade-shaped housing 112.

In some embodiments, the length L of the blade-shaped housing 112 extends along a first plane (such as the X-Y plane of FIG. 3). In some embodiments, the height H extends parallel to a second plane (such as the X-Z plane of FIG. 3). In some embodiments, the width W extends parallel to a third plane orthogonal to said first and said second planes (such as the Y-Z plane of FIG. 3). In some embodiments, the handle portion 120 of the blade-shaped housing 112 is configured to flex about the end portion 116 of the blade-shaped housing 112 along an arc in the first plane (such as the X-Y plane of FIG. 3) which is orthogonal to the second and the third planes. In some embodiments, the blade shaped housing 112 attaches to the power receiving device 102 by inserting an end portion 116 of the blade-shaped housing 112 into a corresponding electrical interface 118 on the side of power receiving device 102 (such as the side of an at least partially electric vehicle 103). In other embodiments the end portion 116 of the blade-shaped housing 112 is inserted into a corresponding electrical interface 118 on the front or back of the power receiving device (such as the front or back of the at least partially electric vehicle.)

In some embodiments, the handle portion 120 of the blade-shaped housing 112 is further configured to at least partially twist about a line extending from the end portion 116 to the handle portion 120 along its length. For example, in FIG. 3, the handle portion 120 is configured to twist along the X-axis. In some embodiments, in use, the twisting may occur simultaneously with the flexing, in which case the line between the end portion 116 and the handle portion 120 about which the twisting occurs will not be straight or along the X-axis.

In some embodiments, the handle portion 120 of the blade-shaped housing 112 is capable of bending in more than just a single plane. In some embodiments, the handle portion 120 of the blade-shaped housing 112 is also capable of twisting in these planes. In some embodiments, the handle portion 120 of the blade-shaped housing 112 can bend and twist in a variety of planes but is restrained from moving in at least one plane, such as being restrained from moving in a vertical direction (i.e., the Z-axis.) In other words, the handle portion 120 of the blade-shaped housing 112 does not flex in the X-Z plane of FIG. 3. In other embodiments, the handle portion 120 of the blade-shaped housing 112 can at least partially flex in all directions although some planes of movement are easier than others.

In some embodiments, a flexible electrical connector 200 is provided for supplying power to a receiving device 102 wherein the flexible electrical connector 200 comprises a blade-shaped housing 112 having a handle portion 120 and an opposing end portion 116, and a power cord 110. The blade-shaped housing has a length, a height, and a width, wherein the length extends between a remote end of the handle portion 120 to a remote end of the end portion 116, and the length is larger than the height which is larger than the width. An electrical interface 302 is located at the end portion 116, wherein the electrical interface 302 is configured to detachably mate with a corresponding electrical interface 118 on an at least partially electric vehicle 103. The power cord 110 extends from the handle portion 120 of the blade-shaped housing 112. The handle portion 120 is configured to flex about the end portion 116 in a plurality of planes. In some embodiments, the handle portion 120 can flex in all directions. In some embodiments, the handle portion 120 can flex in some planes but is substantially restrained from flexing in at least one plane. In some embodiments, the plane in which the handle portion is substantially restrained from flexing is the X-Z plane shown in FIG. 3.

Figure 4:
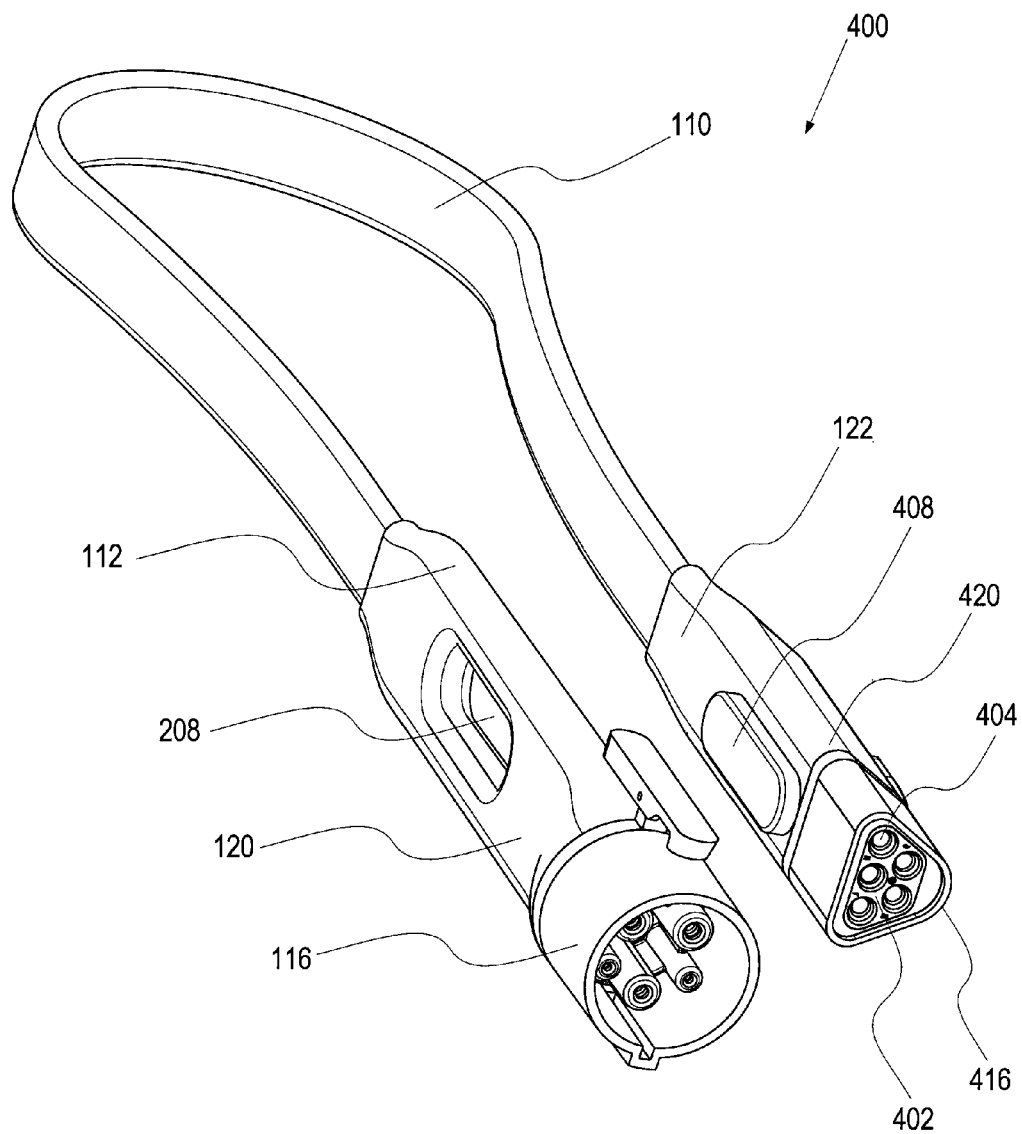
FIG. 4 is a perspective view of an electrical connector kit used in the charging system of FIG. 1A according to one embodiment.

FIG. 4 is a perspective view of an electrical connector kit 400 according to one embodiment. The flexible connector kit 400 comprises a power cord 110, a blade-shaped housing 112 on one end of the power cord 110 configured to detachably connect to the power receiving device 102 (FIG. 1), and an additional housing 122 on the other end of the power cord 110 configured to detachably attach to the power supplying device 106 (FIG. 1).

In some embodiments, the blade-shaped housing 112 of the connector kit 400 comprises an end portion 116 and an opposing handle portion 120. As described above, the end portion 116 contains an electrical interface 302 (shown in FIG. 3) that is configured to detachably mate with a corresponding electrical interface 118 of the power receiving device 102 (shown in FIG. 1B). The cord 110 extends from the handle portion 120, and the handle portion 120 is configured to flex about the end portion 116 along an arc in a single plane (as shown in FIG. 3.)

In some embodiments, the additional housing 122 of the connector kit 400 similarly comprises an end portion 416 and an opposing handle portion 420. In some embodiments, the end portion 416 contains an electrical interface 402 that is configured to detachably mate with a corresponding electrical interface of the power supplying device 106 (shown in FIG. 1A). In some embodiments, the cord 110 extends from the handle portion 420 to the handle portion 120 of the blade-shaped housing 112.

In some embodiments, the electrical interface 402 comprises a plurality of female electrical connector portions 404 configured to mate with corresponding male connector portions on the corresponding electrical interface of the power supplying device 106 (FIG. 1). In some embodiments, one or more of the female electrical connector portions 404 are configured for power transmission while one or more other female electrical connector portions are configured for data transmission. In other embodiments the electrical interface 402 comprises a plurality of male connector portions while the female connector portions are on the corresponding electrical interface of the power supplying device 106.

In some embodiments, the additional housing 122 is substantially identical to the blade-shaped housing 112. In these embodiments, the handle portion 420 of the additional housing 122 is also configured to flex about the end portion 416 along an arc in a single plane (similar to that shown in FIG. 3.)

In other embodiments, the additional housing 122 has a different shape than the blade-shaped housing 112. FIG. 4 illustrates an embodiment where the additional housing 122 has a triangular cross-sectional shape. Both the end portion 416 and the handle portion 420 have a triangular cross-section. In some embodiments, only the end portion 416 has a different shape, such as a triangular cross-section, as opposed to the circular cross-section of the end portion 116 of the blade-shaped housing 112. In some embodiments, the end portion 116 of the blade-shaped housing 112 has a distinctly different shape than the end portion 416 of the additional housing 122. When the end portions 116 of the blade-shaped 112 housing has a distinctly different cross-section than the end portion 416 of the additional housing 122 the electrical interfaces cannot be improperly engaged because their different cross-sections make plugging them into the wrong corresponding electrical interface (in the power receiving device 102 and the power supplying device 106) impossible. In some embodiments, the handle portion 420 of the additional housing 122 has a circular cross-section which, if sufficiently small in diameter, allows it to flex about the end portion 416 in many planes.

Regardless of the blade-shape or triangular cross-sectional shape of the additional housing 122 (or end portion 416), in some embodiments, the additional housing 122 further comprises a protruding element 408. The protruding element 408 is shaped to snuggly fit within hole 208 in the blade-shaped housing 112, so that the kit can be folded and stored at described in relation to FIG. 5.

Figure 5:
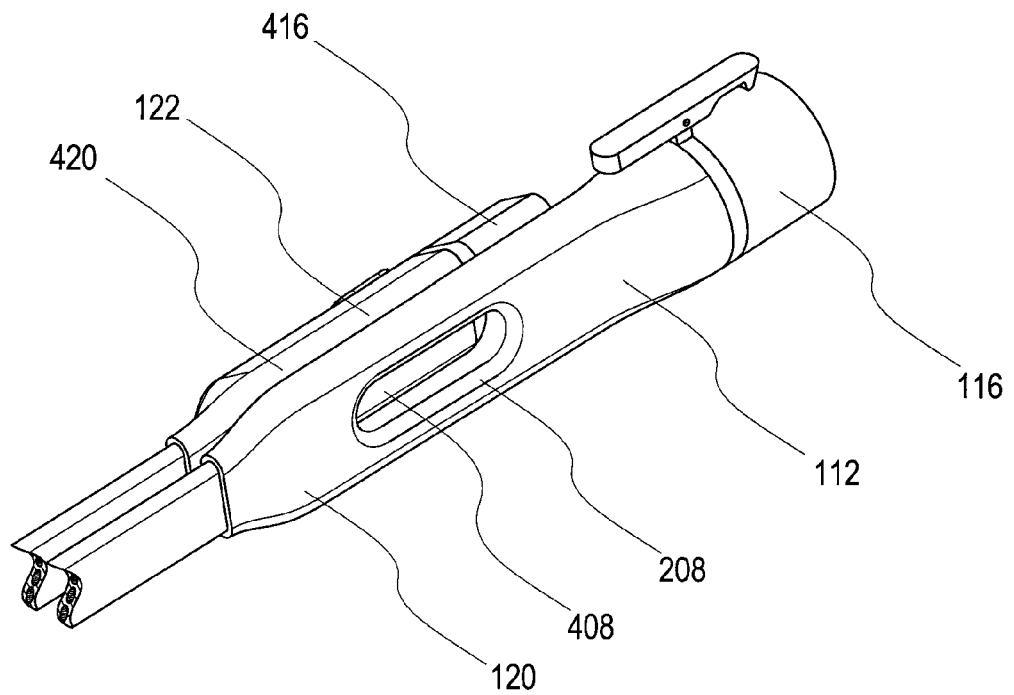
FIG. 5 is a perspective view of the electrical connector kit of FIG. 4 illustrating two detachable connector ends attached together.

FIG. 5 is a perspective view illustrating how the blade-shaped housing 112 and the additional housing 122 of the electrical connector kit 400 attach together according to some embodiments. The protruding element 408 is shaped to fit in the hole 208 in the blade-shaped housing 112 (specifically the hole 208 in the handle portion 120) such that the protruding element 408 will remain at least partially frictionally restrained in the hole 208 after the protruding element 408 and the hole 208 have been pressed together.

In some embodiments, the handle portion 120 of the blade shaped housing 112 and the handle portion 120 of the additional housing 122 handle portion 420 are both made of a substantially resilient material as discussed above with relation to FIG. 2. Similarly, in some embodiments the blade shaped housing 112 and the end portion 116 of the additional housing 122 end portion 416 are both made of a substantially rigid material as discussed above with relation to FIG. 2. In other embodiments, the entire additional housing 122 is made of a substantially rigid material.

Figure 6A:
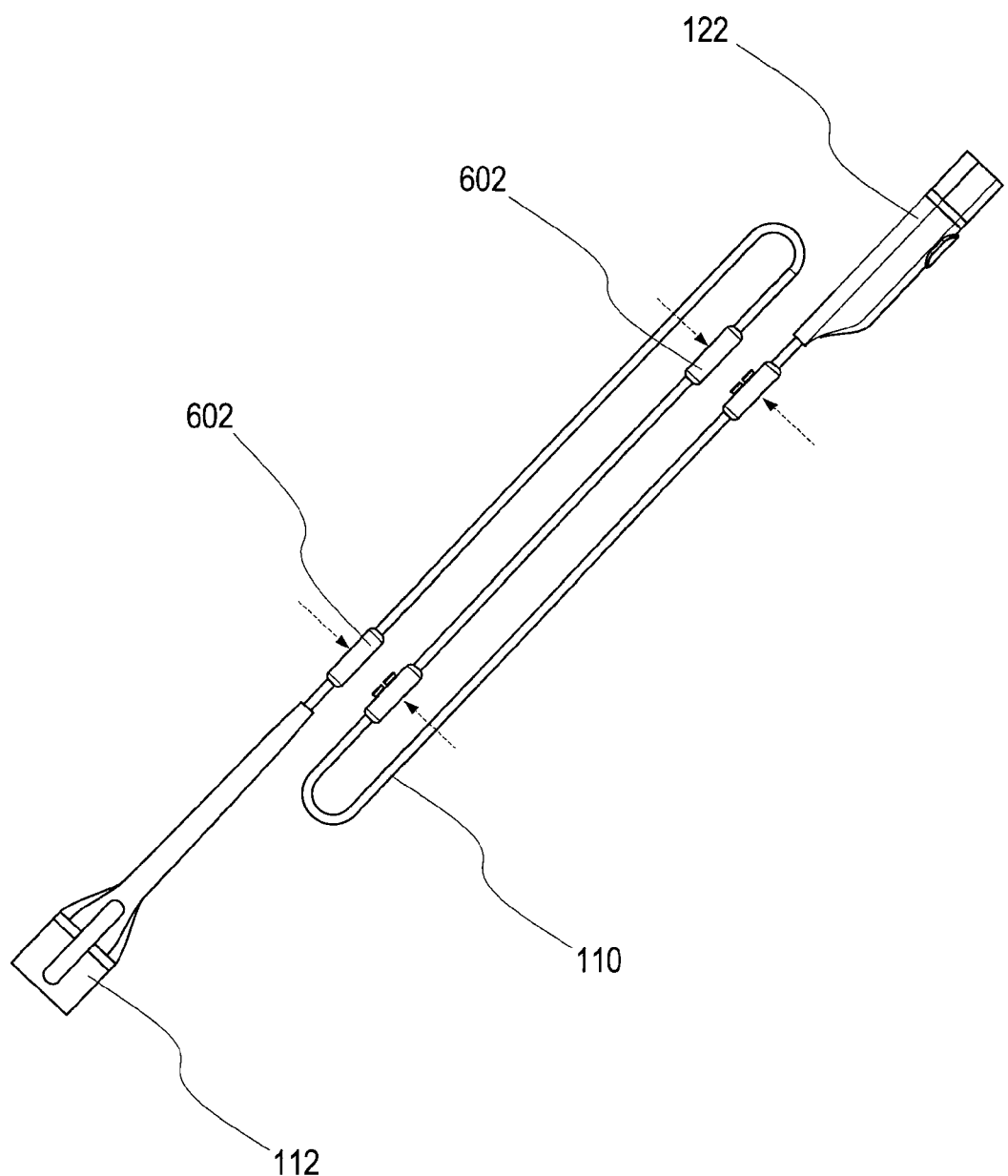
FIG. 6A is a side view of an embodiment of the power cord of FIG. 1A with attachment mechanisms.

FIG. 6A is a side view of an embodiment of the power cord 110 with attachment mechanisms 602. In some embodiments, the power cord 110 has one or more attachment mechanisms 602. FIG. 6A illustrates the electrical connector kit 400 having two detachable connectors (the blade-shaped housing 112 and the additional housing 122). However, the attachment mechanisms 602 are also useful in other embodiments such as the flexible electrical connector 200 of FIG. 2. The connector mechanisms 602 are useful in the connector kit 400 embodiment for aiding the user in folding up and neatly storing the connector kit 400. As such, the user 114 can use the cable kit 400 to attach the power receiving device 102 to the power supplying device 106 for charging, and when the charging is complete the user 114 can fold up the cable kit elements, snap them together, and store them away until they are needed again. In some embodiments, the cable kit 400 can be stored in a bag, in the trunk, or a cable kit compartment in the door of an at least partially electric vehicle 103. When the power cord 110 attaches to itself by the attachment mechanisms 602, it is capable of being compactly stored and may be less likely to become tangled or damaged. In some embodiments, the two detachable connectors (the blade-shaped housing 112 and the additional housing 122) of the electrical connector kit 400 are additionally held together for neat storage by the mating of the protruding element 408 and hole 108 as discussed with relation to FIG. 5.

As illustrated in FIG. 6A, in some embodiments, the power cord 110 is substantially flat. The substantially flat cross section of the power cord 110 allows it to more easily bend and fold into a compact space for storage and portability. As illustrated and described in relation to FIG. 2, in some embodiments, the power cord 110 houses both a power cable 202 and a data cable 204. In some embodiments, the one or more attachment mechanisms 602 are on the flat portion of the power cord 110. In some embodiments, the attachment mechanisms 602 are snaps such as metal snaps, hard plastic snaps, or flexible rubber snaps. In other embodiments the attachment mechanisms 602 are magnets or electromagnets. In still other embodiments the attachment mechanisms 602 are clips. In yet other embodiments the attachment mechanisms 602 are hook and loop elements such as VELCRO® patches, loops, and ribbons. In some embodiments, the attachment mechanisms are spaced equally along the length of the power cord 110. In some embodiments, the power cord 110 may include crease lines to aid in bending the power cord 110 at particular predetermined points in order to align the attachment mechanisms 602 as well as the protruding element 408 and hole 208 (FIG. 5).

Figure 6B:
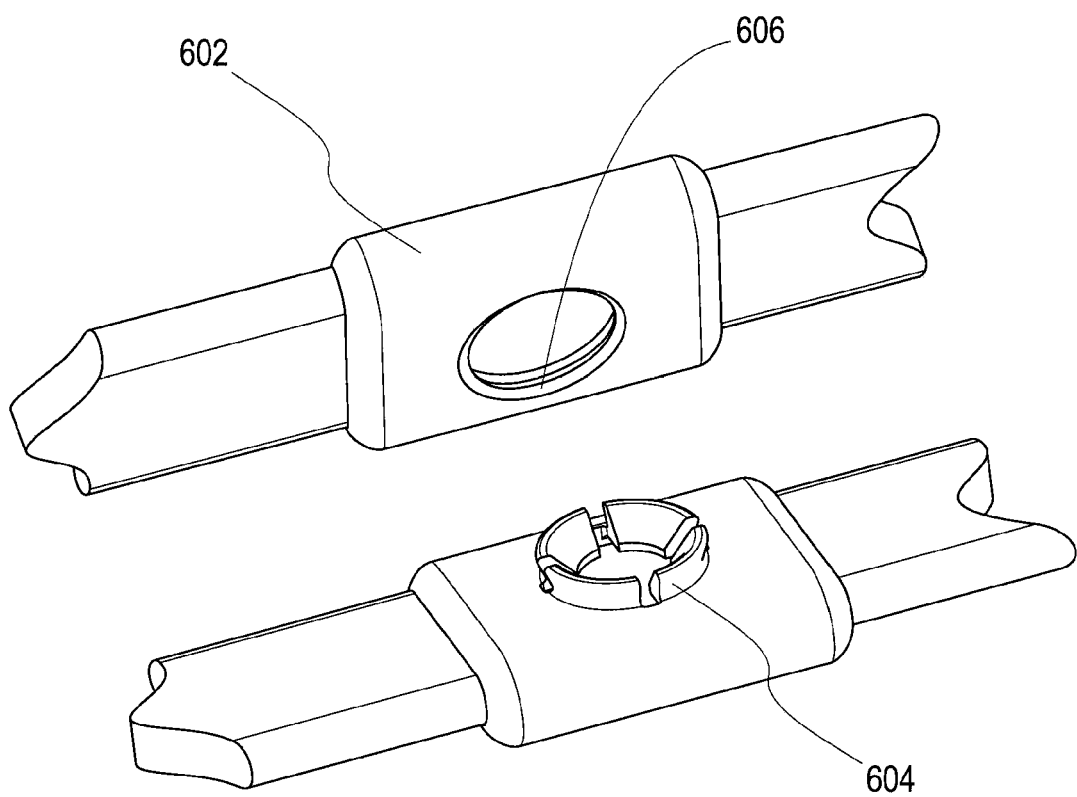
FIG. 6B is a perspective view of one embodiment of an attachment mechanism of FIG. 6A.

FIG. 6B is a perspective view of one embodiment of an attachment mechanism 602 of FIG. 6A. The attachment element illustrated in FIG. 6B is a snap having a male portion 604 and a female portion 606. In some embodiments, the male 604 and female 606 snaps are made of metal, plastic, or a resilient material similar to the material used for the handle portion 120 of the blade-shaped housing 112 described with relation to FIG. 2. When the user 114 folds up the cable 110 the user 114 brings the male portion 604 and female portion 606 into contact with one another and snaps them together.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A flexible electrical connector for supplying power to a receiving device, the flexible electrical connector comprising:
   a blade-shaped housing having a first portion and an opposing second portion, wherein the second portion defines a handle that is configured to flex about the first portion of the housing along an arc in a single plane, the arc extending about −35° to about 35° from a longitudinal axis of the housing extending from the first portion to the second portion when the flexible electrical connector is in a rest position;
   an electrical interface at the first portion of the housing, wherein the electrical interface is configured to detachably mate with a corresponding electrical interface on the receiving device; and
   a power cord extending from the second portion of the housing;
   wherein the blade-shaped housing has two substantially parallel sidewalls defining a length and a height of the housing, the sidewalls being set apart by a width that is smaller than the height which is smaller than the length; and
   wherein the single plane about which the handle can flex is substantially perpendicular to the sidewalls and substantially parallel to the length.

2. The flexible electrical connector of claim 1, wherein the receiving device is an at least partially electric vehicle and the single plane is parallel to a plane formed by a bottom surface of the at least partially electric vehicle, and wherein the handle is further configured to substantially resist flexing in an additional plane.

3. The flexible electrical connector of claim 2, wherein the additional plane is perpendicular to the single plane.

4. The flexible electrical connector of claim 1, wherein the length is at least twice as long as the height and the height is at least twice as long as the width.

5. The flexible electrical connector of claim 1, wherein the second portion of the blade-shaped housing is further configured to at least partially twist about a line extending from the first portion to the second portion.

6. The flexible electrical connector of claim 1, wherein the second portion of the blade-shaped housing is made of a resilient material.

7. The flexible electrical connector of claim 1, wherein the handle defines an opening in the second portion to allow a user to better grip the handle by sliding his fingers through the opening.

8. The flexible electrical connector of claim 1, wherein the plane extends through both the electrical interface and the corresponding electrical interface on the receiving device.

9. The flexible electrical connector of claim 1, wherein the power cord is substantially flat.

10. The flexible electrical connector of claim 9, wherein the power cord is foldable with attachment mechanisms for attaching to itself, the attachment mechanisms selected from the group consisting of metal snaps, flexible snaps, magnets, clips, and hook and loop elements.

11. The flexible electrical connector of claim 1, wherein the power cord includes high current power cables and low current data cables.

12. The flexible electrical connector of claim 1, wherein the first portion further comprises a lock for fixing the flexible electrical connector to the receiving device.

13. The flexible electrical connector of claim 12, wherein the lock is configured to release when one or more of the following occur: the receiving device is fully charged, a user remotely unlocks the receiving device using a wireless unlocking device, and the charging is cancelled.

14. The flexible electrical connector of claim 1, wherein the blade-shaped housing has a length, a height, and a width;
wherein when attached to the receiving device the length extends from a remote end of the first portion to a remote end of the second portion along a first plane extending there through, the height extends parallel to a second plane extending from a top of the receiving device to a bottom of the receiving device, and the width extends parallel to a third plane orthogonal to said first and said second planes; and
wherein the second portion of the housing is configured to flex about the first portion of the housing along an arc in the first plane which is orthogonal to the second and the third planes.

15. The flexible electrical connector of claim 1, wherein the entire first portion of the housing along the longitudinal axis is the electrical interface, and the entire second portion of the housing along the longitudinal axis is the handle.

16. The flexible electrical connector of claim 1, the arc extending about −50° to about 50° from the longitudinal axis of the housing extending from the first portion to the second portion when the flexible electrical connector is in the rest position.

17. The flexible electrical connector of claim 1, the arc extending about −90° to about 90° from the longitudinal axis of the housing extending from the first portion to the second portion when the flexible electrical connector is in the rest position.

18. The flexible electrical connector of claim 1, the arc extending about −120° to about 120° from the longitudinal axis of the housing extending from the first portion to the second portion when the flexible electrical connector is in the rest position.

19. A flexible electrical connector kit for supplying power to a receiving device, the flexible electrical connector kit comprising:
a first blade-shaped housing having a first portion and an opposing second portion;
the second portion defining a handle that is configured to flex about the first portion of the housing along an arc in a single plane, the arc extending about −35° to about 35° from a longitudinal axis of the housing extending from the first portion to the second portion when the flexible electrical connector is in a rest position; and
an electrical interface at the first portion of the housing, wherein the electrical interface is configured to detachably mate with a corresponding electrical interface on a receiving device;
a power cord extending from the second portion of the housing; and
a second housing having a first portion and an opposing second portion;
an electrical interface at the first portion of the second housing, wherein the electrical interface is configured to detachably mate with a corresponding electrical interface on a power supply device; and
the power cord extending from the second portion of the second housing;
wherein the first blade-shaped housing has two substantially parallel sidewalls defining a length and a height of the housing, the sidewalls being set apart by a width that is smaller than the height which is smaller than the length; and
wherein the single plane about which the handle can flex is substantially perpendicular to the sidewalls and substantially parallel to the length.

20. The flexible electrical connector kit of claim 19, wherein the first portion of the blade-shaped housing and the first portion of the second housing are made of a substantially rigid material.

21. The flexible electrical connector kit of claim 19, wherein the second portion of the blade-shaped housing defines a hole there through and the second portion of the second housing comprises a protruding element shaped to fit the hole in the blade-shaped housing such that the protruding element will remain at least partially frictionally restrained in the hole after the protruding element and the hole have been pressed together.

22. A flexible electrical connector for supplying power to a receiving device, the flexible electrical connector comprising:
a blade-shaped housing having a first portion and an opposing second portion, wherein the second portion defines a handle that is configured to flex about the first portion of the housing along an arc in a single plane, the arc extending about −35° to about 35° from a longitudinal axis of the housing extending from the first portion to the second portion when the flexible electrical connector is in a rest position;
an electrical interface at the first portion of the housing, wherein the electrical interface is configured to detachably mate with a corresponding electrical interface on an at least partially electric vehicle; and
a power cord extending from the second portion of the housing;
wherein the blade-shaped housing has two substantially parallel sidewalls defining a length and a height of the housing, the sidewalls being set apart by a width that is smaller than the height which is smaller than the length; and
wherein the single plane about which the handle can flex is substantially perpendicular to the sidewalls and substantially parallel to the length.

* * * * *